United States Patent [19]
Obuchi et al.

[11] Patent Number: 5,916,950
[45] Date of Patent: Jun. 29, 1999

[54] RESIN COMPOSITION AND MOLDED ARTICLES THEREOF

[75] Inventors: Shoji Obuchi; Takayuki Watanabe; Yasuhiro Kitahara; Tomoyuki Nakata; Kazuhiko Suzuki; Masanobu Ajioka, all of Kanagawa-ken, Japan

[73] Assignee: Mitsui Chemicals, Inc., Tokyo, Japan

[21] Appl. No.: 08/895,828

[22] Filed: Jul. 17, 1997

[30] Foreign Application Priority Data

Jul. 26, 1996 [JP] Japan .................................. 8-197254

[51] Int. Cl.⁶ .............................. C08L 67/04; C08K 3/34
[52] U.S. Cl. ...................... 524/492; 524/493; 524/539; 525/411; 525/450; 528/359; 528/361
[58] Field of Search ..................... 524/492, 539; 525/411, 450; 528/359, 361

[56] References Cited

U.S. PATENT DOCUMENTS

| | | | |
|---|---|---|---|
| 4,839,130 | 6/1989 | Kaplan et al. | 264/331.21 |
| 5,637,631 | 6/1997 | Kitada et al. | 528/272 |
| 5,691,424 | 11/1997 | Suzuki et al. | 528/361 |
| 5,786,408 | 7/1998 | Kuroda et al. | 525/450 |

FOREIGN PATENT DOCUMENTS

| | | |
|---|---|---|
| 0446852 | 9/1991 | European Pat. Off. . |
| 0661346 | 7/1995 | European Pat. Off. . |
| 0765913 | 4/1997 | European Pat. Off. . |

*Primary Examiner*—Andrew E. C. Merriam
*Attorney, Agent, or Firm*—Burns, Doane, Swecker & Mathis, L.L.P.

[57] ABSTRACT

A thermal resistant resin composition comprising 100 parts by weight of polyester (A) having 25–75% by weight of a lactic acid component consisting of 25–75% by weight of a lactic acid-based polymer (a1) and 25–75% by weight of other aliphatic polyester (a2) having a melting point of 100–250° C., and 0.1–70 parts by weight of a crystalline inorganic filler (B) containing 10% by weight or more of $SiO_2$. The thermal resistant resin composition of the invention performs following function:

1) injection molding can be carried out at a mold temperature of Tg or less or around room temperature with a short molding-cycle, 2) quick crystallization velocity and satisfactory crystallinity can be attained in the molding step, and 3) the molded articles have, as a result, excellent thermal resistance and generate properties of low deterioration of a high polymer component and slow embrittlement in use.

17 Claims, No Drawings

RESIN COMPOSITION AND MOLDED ARTICLES THEREOF

BACKGROUND OF THE INVENTION

1. Field of the Invention

The present invention relates to a lactic acid-based polymer resin composition and molded articles thereof.

More specifically, the invention relates to a lactic acid-based polymer resin composition and molded articles thereof which have excellent thermal resistance, impact resistance and molding ability and can degrade after use in the natural environment.

2. Description of the Related Art

Generally, containers having excellent thermal resistance and impact resistance are prepared from polypropylene, crystalline polyethylene terephthalate (hereinafter referred to as PET) and other resins.

However, these resins increase the amount of refuse in the waste disposal after use. Additionally, these resins are scarcely degraded in the natural environment, and thus semipermanently remain in the ground even after burial disposal. Scenery is also impaired by disposed plastics and problems of destroying living environment of marine organisms have emerged.

On the other hand, polylactic acid, a copolymer of lactic acid with other aliphatic hydroxycarboxylic acids and polyesters derived from aliphatic polyhydric alcohol and aliphatic polycarboxylic acid have been developed as thermoplastic polymers having biodegradability.

These polymers can completely biodegrade in an animal body within several months to a year. When placed in soil or sea water, these polymers start degradation within several weeks under wet conditions and disappear in one to several years. Further those polymers are characterized by finally decomposing into lactic acid, carbon dioxide and water which are nontoxic to the human body.

Particularly, polylactic acid is expected to extend the field of its use, because the raw material L-lactic acid has recently come to be manufactured in a large scale and cheaply by a fermentation process and polylactic acid has an excellent characteristic of high stiffness.

However, containers and packaging materials obtained by common injection molding and other processing methods have a disadvantage of thermal resistance, though excellent in stiffness. Consequently, polylactic acid was inadequate for uses in high temperature, for example, a container wherein hot water is poured and a container for use in a microwave oven.

The prior art in order to provide thermal resistance for polylactic acid differs from common processing technique, and specific examples thereof include, for example, a technique for not taking the molded article out of the mold immediately after processing, but holding the article as intact in the mold for a long time at a temperature around TC (crystallization temperature) until the polylactic acid molded article obtains high crystallinity, and a technique for processing by conventional techniques and successively carrying out annealing (heat treatment) of the molded article to give high crystallinity.

However, these conventional processing techniques for providing polylactic acid with thermal resistance, for example, crystallization is not always satisfactory in the former case and the molded article sometimes deforms in the course of crystallization in the latter case. Thus each of these processes has problems, respectively.

Further, these conventional processing techniques for providing thermal resistance for polylactic acid require specific conditions or very long time in the steps as compared with common processing techniques. As a result, these techniques increase manufacturing cost and are not always practical.

Specific examples of techniques for accelerating the crystallization velocity of general purpose high polymer materials include, for example, the technique disclosed in Japanese Laid-Open Patent Sho 60-86156.

The patent has disclosed a technique for adding fine powder of overall aromatic polyester having primary constitution units of terephthalic acid and resorcinol as a nucleating agent (crystallization accelerator) in order to accelerate crystallization of PET.

Techniques for providing thermal resistance for degradable high polymer materials have been known to involve adding a nucleating agent similar to the case of the general purpose high polymer materials. Specific examples which have disclosed these techniques include, for example, WO 90/01521, U.S. Pat. No. 5,180,765, WO 92/04413 and Japanese Laid-Open Patent Hei 4-220456.

WO 90/01521 has disclosed a technique for increasing hardness, strength and thermal resistance by addition of inorganic fillers such as silica and kaolinite to lactide based thermoplastic resins. An example thereof involves preparing a sheet having increased crystallinity by adding 5% by weight of calcium lactate as a nucleating agent to an L- and DL-lactide copolymer and blending on hot rolls at 170 ° C. for 5 minutes. The high-crystalline sheet is described to be excellent in stiffness and strength, but low in transparency and cloudy.

The present inventors practically applied the technique to polylactic acid. That is, injection molding was tried by adding silica, kaolinite and talc as nucleating agents to polylactic acid. However, problems were found at least in the following two points and a molded article suited for practical use could not be obtained.

1) Slow crystallization velocity and insufficient crystallinity

2) Deterioration of high polymer component and embrittlement of molded article

WO 92/04413 has disclosed a technique for adding lactic acid salt or benzoic acid salt as a nucleating agent to degradable polymers. In the examples of the invention, it has been described to blend a polylactide copolymer with 1% of calcium lactate, carry out injection molding with a residence time of 2 minutes in the mold by using a mold maintained at around 85° C., and thereafter anneal in the mold at 110–135° C.

The present inventors practically applied the technique to polylactic acid. That is, injection molding was tried by adding calcium lactate and sodium benzoate as nucleating agents to polylactic acid. However, problems were found at least in the following two points and a molded article suited for practical use could not be obtained.

1) Slow crystallization velocity and insufficient crystallinity

2) Deterioration of high polymer component and embrittlement of molded article

Japanese Laid-Open Patent Hei 4-220456 has disclosed a technique for adding polyglycolic acid and a derivative thereof as a nucleating agent to poly-L-lactide and increasing mold temperature to Tg (glass transition temperature) or higher in the injection molding step. By the technique, crystallization velocity is increased, molding cycle time is reduced, and the molded product obtains excellent mechanical properties. It is described in the example of injection molding that crystallinity is 22.6% after cooling for 60 seconds in the absence of a nucleating agent, and 45.5% in the presence of the nucleating agent.

The present inventors practically applied the technique to polylactic acid. That is, polyglycolic acid was added to polylactic acid as a nucleating agent, mold temperature was increased to Tg or higher, and injection molding was tried. However, injection molding was failed when the mold temperature was Tg or higher.

The present inventors have already disclosed in European Patent A-661346 a technique for mixing polylactic acid with crystalline inorganic powder which contains 50% or more of crystalline $SiO_2$ as a nucleating agent, melting the resulting mixture and carrying out molding while proceeding crystallization. The technique can provide heat resistant molded articles and is thus very significant. However, the technique requires filling molten resin in a mold which is maintained at 85–125° C. in order to crystallize the resin in the mold, and thus has the following problems.

1) A mold having special structure and oil circulating equipment for maintaining the mold at high and constant temperature are required and result in high cost of plant and equipment.

2) Time is required for crystallizing in the mold and thus a molding cycle is prolonged and productivity becomes poor as compared with molding of a general purpose resin.

3) A mold for molding complicated articles or a multiple cavity mold is difficult to design due to special structure of the mold.

4) The above disadvantages lead to high manufacturing cost.

As mentioned above, in the case of providing thermal resistance for polylactic acid, simple application of a common nucleating agent such as talc, silica and other inorganic materials, organic carboxylate salt and polymer to a conventional processing method such as injection molding, blow forming and compression molding cannot provide molded articles which have high crystallinity and thermal resistance to temperatures of 100° C. or more.

SUMMARY OF THE INVENTION

One object of the invention is to provide a polylactic acid-based thermal-resistant resin composition and molded articles thereof which have excellent thermal resistance and molding ability in addition to the essential stiffness and excellent degradability of polylactic acid.

Another object of the invention is to provide a polylactic acid-based thermal-resistant resin composition and molded articles thereof which can be applied to conventional processing techniques having high productivity and thereby can prepare molded articles having excellent heat resistance and molding ability.

A further object of the invention is to provide a polylactic acid-based thermal-resistant resin composition and molded articles which can be injection molded at a mold temperature of Tg and less or around room temperature at least in the molding step even though applied to a usual processing technique having high productivity, exhibit quick crystallization velocity of the molded articles in the molding, and attain satisfactory crystallinity, and which consequently have excellent thermal resistance and demonstrate property of low deterioration of a high polymer component in the molded articles and small embrittlement of the molded articles in the course of using the molded articles.

As a result of an intensive investigation in order to solve the above objects, the present inventors have found that, when injection molding the resin composition obtained by mixing polylactic acid with aliphatic polyester having a melting point of 100–250° C. and crystalline inorganic filler at a mold temperature of Tg and less or around room temperature, the molded article has quick crystallization velocity in the molding, crystallinity is satisfactory, and thus the molded article obtained has excellent thermal resistance. Thus the present invention has been completed.

That is, one aspect of the invention is a thermal resistant resin composition comprising 100 parts by weight of polyester (A) having 25–75% by weight of lactic acid component consisting of 25–75% by weight of lactic acid-based polymer (a1) and 75–25% by weight of aliphatic polyester (a2) having a melting point of 100–250° C., and 0.1–70 parts by weight of crystalline inorganic filler (B) containing 10% by weight or more of $SiO_2$ and a molded article obtained therefrom and having heat resistance of 100–130° C.

DETAILED DESCRIPTION OF PREFERRED EMBODIMENTS

The present invention will hereinafter be described in detail. When references are cited in the specification, any description in these references, unless otherwise noted in particular, is regarded as a part of the present specification due to clear indication of cited references and cited scopes and considered to be an item or disclosure to which a person skilled in the art can directly and straightly understand by referring to the clearly indicated scope of citation in view of the item and disclosure described in the present specification.

In the invention, the term "conventional processing technique having high productivity," does not mean a special and lowly productive processing technique wherein a high mold temperature and long molding cycle are required for heat-treating the molded article, but means a common and highly productive processing technique which can be carried out under usual mold temperature with a short molding cycle.

Further, the term "a conventional, processing technique having high productivity" means a processing technique, for carrying out the processing by using a conventional processing machine with a molding cycle equivalent to general purpose resin such as polypropylene resin without using a specific method such as annealing treatment in the mold.

In the invention, the term "excellent thermal resistance" means that the molded article has heat resisting temperature of 100–130° C.

In the invention, the heat resistance temperature is the same as the Vicat softening point and such temperature is determined at standard pressure.

The term "excellent thermal resistance" also means that the molded article is suitable for uses in a high temperature, for example, containers for pouring hot water.

Further, the term "excellent thermal resistance" means that the molded article has high crystallinity.

Polyester (A) in the invention which has 25–75% by weight of a lactic acid-based polymer (a1) and 75–25% by weight of the other aliphatic polyester (a2) having a melting point of 100–250° C.

In the invention, the lactic acid-based polymer (a1) includes polylactic acid, copolymer of lactic acid with other aliphatic hydroxycarboxylic acid, copolymer of lactic acid and aliphatic dihydric alcohol with aliphatic dicarboxylic acid, polymer blend which is a mixture thereof, and polymer alloy.

Specific examples of lactic acid which is a raw material of polylactic acid include L-lactic acid, D-lactic acid, DL-lactic acid and a mixture thereof, and lactide which is a cyclic dimer of lactic acid. However, polylactic acid obtained is required to have crystallinity. Thus, the content of either L-lactic acid or D-lactic acid in the mixture thereof is required to be 75% by weight or more.

Specific examples of aliphatic hydroxycarboxylic acid in the lactic acid-based copolymer include glycolic acid, 3-hydroxybutyric acid, 4-hydroxybutyric acid, 4-hydroxyvaleric acid, 5-hydroxyvaleric acid and 6-hydroxycaproic acid, and further include cyclic ester of aliphatic hydroxycarboxylic acid, for example, glycolide which is a dimer of glycolic acid and $\epsilon$-caprolactone which is a cyclic ester of 6-hydroxycaproic acid. These compounds can be used singly or as a mixture. 6-Hydroxy caproic acid and 6-caprolactone are preferably used in particular.

Specific examples of aliphatic dihydric alcohol which can be used in a lactic acid-based copolymer include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and 1,4-benzenedimethanol. Specific examples of aliphatic dicarboxylic acid include, for example, succinic acid, oxalic acid, malonic acid, glutaric acid, adipic acid, pimelic acid, suberic acid, azelaic acid, sebacic acid, undecanoic diacid, dodecanoic diacid, phenylsuccinic acid and 1,4-phenylenediacetic acid. These compounds can be used singly or as a mixture. A combination of 1,4-butanediol and succinic acid is preferred in particular.

Specific examples for preparing the lactic acid-based polymer (a1) which can be used in the invention include, for example, 1) a process for carrying out direct dehydration polycondensation by using lactic acid or a mixture of lactic acid and aliphatic hydroxycarboxylic acid as a raw material (a preparation process of, for example, U.S. Pat. No. 5,310,865), 2) a ring-opening polymerization for melting and polymerizing a cyclic dimer of lactic acid (lactide) (a preparation process disclosed, for example, in U.S. Pat. No. 2,758,987), 3) a ring-opening polymerization process for melting and polymerizing the cyclic dimer of lactic acid (lactide) with a cyclic dimer of aliphatic hydroxycarboxylic acid such as glycolide and $\epsilon$-caprolactone in the presence of a catalyst (U.S. Pat. No. 4,057,537), 4) a direct dehydration polycondensation process of a mixture of lactic acid, aliphatic alcohol and aliphatic dicarboxylic acid (a process disclosed, for example, in U.S. Pat. No. 5,428,126), and 5) a process for condensing polylactic acid with a polymer of aliphatic dihydric alcohol and aliphatic dicarboxylic acid in the presence of an organic solvent (a process disclosed, for example, in EP 0712880 A2).

However, no particular restriction is imposed upon the preparation process.

Polymerization can also be carried out in the presence of a small amount of aliphatic polyhydric alcohol such as glycerol, aliphatic polycarboxylic acid such as butanetetracarboxylic acid or polyhydric alcohol such as polysaccharide. Molecular weight can also be increased by using a linking agent (high polymer chain extender) such as diisocyanate.

The lactic acid-based copolymer can be a random copolymer, a block copolymer or a mixture of these copolymers. The block copolymer is preferably used.

The lactic acid-based copolymer is sometimes excellent in flexibility as compared with polylactic acid. When the component ratio is adjusted, flexibility and transparency can be controlled and degradability in soil and hydrolyzability can be also regulated.

No particular limitation is put upon the weight average molecular weight (MW) and molecular weight distribution of the lactic acid-based polymer (a1) so long as the polymer can be substantially processed. No particular restriction is imposed upon the molecular weight of the lactic acid-based polymer (a1) of the invention so long as exhibited mechanical properties are substantially satisfactory. Generally, the weight average molecular weight (MW) is preferably 10,000–500,000, more preferably 30,000–400,000, most preferably 50,000–300,000.

Generally, the weight average molecular weight (MW) lower than 10,000 leads to insufficient mechanical properties. On the other hand, when the molecular weight exceeds 500,000, the polymer becomes difficult to handle or poor in economy.

The amount of lactic acid units in the lactic acid-based copolymer is generally 50% by weight or more, preferably 60% by weight or more, more preferably 70% by weight or more, most preferably 80% by weight or more. The lactic acid-based copolymer having 50% or more by weight of the lactic acid units has stiffness and relatively fast biodegradability similar to polylactic acid. The copolymer loses stiffness and biodegradation velocity become too slow with decrease in the lactic acid units.

The lactic acid-based polymer (a1) which can be preferably used in the invention is polylactic acid, a copolymer of lactic acid with 6-hydroxycaproic acid or $\epsilon$-caprolactone and copolymer of lactic acid with 1,4-butanediol and succinic acid. Polylactic acid, a block copolymer of lactic acid with caprolactone and block copolymer of lactic acid with polybutylene succinate are preferred in particular.

Aliphatic polyester (a2) in the invention can be prepared from various combinations of the above aliphatic hydroxycarboxylic acid, aliphatic dihydric alcohol and aliphatic dicarboxylic acid. No particular restriction is imposed upon aliphatic polyester so long as the melting point of polyester is 100–250° C. Aliphatic polyester having a crystalline property and biodegradability is used. Preferred aliphatic polyester is polyethylene oxalate, polybutylene oxalate, polyethylene succinate, polyneopentyl glycol oxalate, polybutylene succinate, polyglycolic acid, polyhydroxybutyric acid and a copolymer of β-hydroxybutyric acid with β-hydroxyvaleric acid. Polyethylene succinate and polybutylene succinate are preferred in particular.

Aliphatic polyester (a2) has an weight average molecular weight (MW) of usually 10,000–1,000,000, preferably 30,000–500,000, more preferably 50,000–300,000. Further, the polyester can also extend its polymer chain with a linking agent such as diisocyanate.

Aliphatic polyester (a2) plays a role for accelerating crystallization in the composition of the invention together with a below described crystalline inorganic filler in the mold which is maintained at Tg of polyester (A) and less or around room temperature. Aliphatic polyester having a melting point lower than 100° C. has no effect. Even though the polyester has such effect, the effect is exhibited insufficiently when injection molding is carried out by maintaining the mold at Tg and less or around room temperature. Further, molded articles thus obtained conventional thermal resistance of less than 100° C. and the object of the invention cannot be achieved.

It is important that polyester (A) contains 25–75% by weight of aliphatic polyester (a2). When the content is less than 25%, longer cooling time is required in the injection molding step, and productivity is impaired. In some cases, crystallization velocity is decreased and thermal resistance cannot be obtained under conventional molding conditions.

It is important in the invention that polyester (A) contains 25–75% of the lactic acid component. When the proportion of the lactic acid component is higher than 75% weight, longer cooling time is required in the molding step. As a result, molding cycle is extended and productivity is impaired. Further, the molded article thus obtained has a Vicat softening point of about 60° C. and is poor in thermal resistance. As a result, the object of the invention cannot be attained.

On the other hand, when the lactic acid component is less than 25% by weight, molded articles such as dinnerware and trays which come into contact with food impair fungus resistance and other sanitary properties, and biodegradability of these articles in compost is also decreased.

In the invention, the crystalline inorganic filler (B) is added to polyester (A) in order to reduce molding time and accelerate crystallization velocity in the molding operation.

No particular restriction is put upon the crystalline inorganic filler (B) so long as the filler contains 10% by weight or more of $Sio_2$.

The filler (B) includes talc, kaolin, clay and kaolinite. The crystalline inorganic filler can be used singly as as mixture.

The $SiO_2$ content in the crystalline inorganic filler (B) is generally 10% by weight or more, preferably 20% by weight or more, more preferably 30 by weight or more, still more preferably 40% by weight or more, most preferably 50% by weight or more.

No particular limitation is imposed upon the pH of the crystalline inorganic filler (B). The pH is preferably in the range of 3.0–10.0, more preferably in the range of 3.5–9.0, most preferably in the range of 4.0–8.0 in order to prevent polyester A from molecular weight reduction due to heat deterioration in the processing step and accompanied decrease in strength of the molded articles.

The mixing proportion of the crystalline inorganic filler (B) to polyester (A) is generally 0.1–70 parts by weight, preferably 5–65 parts by weight, more preferably 10–60 parts by weight, most preferably 20–50 parts by weight for 100 parts by weight of polyester (A). The proportion less than 0.1 part by weight extends molding time in the processing step and the effect of filler addition cannot be found. On the other hand, the proportion more than 70 parts by weight leads to insufficient mixing and dispersion of the crystalline inorganic filler (B) in polyester (A) or results in impairment of extrusion forming properties such as lowering of stability and workability of strand in the pelletizing step.

No particular restriction is put upon the preparation process of the thermal resistant resin composition of the invention. Known processes which are usually employed in thermoplastic resin can be used. That is, polyester (A) and the crystalline inorganic filler (B) are uniformly mixed with a stirrer such as high speed stirrer and low speed stirrer and successively melt kneaded with a single-screw or multi-screw extruder having sufficient kneading capacity.

The resin composition of the invention has preferably a shape of pellet, granule or powder.

Further, the resin composition of the invention can be incorporated with various stabilizers, ultraviolet absorbers, flame retardants, internal mold release agents, lubricants, plasticizers and inorganic fillers depending upon the object of the invention.

It is particularly recommended to add internal mold release agents in order to further improve molding property which is an object of the invention. Exemplary mold release agents which can be used in the invention include common higher fatty acid, salt and ester oil thereof; silicone oil, polyvinyl alcohol, polyalkylene glycol and low molecular weight polyolefin. Silicone oil is preferred in particular. Specific examples of silicone oil include dimethylsilicone oil, methylhydrogensilicone oil, methylphenylsilicone oil, cyclic dimethylsilicone oil and other straight silicone oils; and polyether modified silicone oil, methylstyryl modified silicone oil, alkyl modified silicone oil, higher fatty acid ester modified silicone oil, hydrophilically and specifically modified silicone oil, higher fatty acid containing silicone oil and other modified silicone oils. Dimethylsilicone oil, methylphenylsilicone oil and cyclic dimethylsilicone oil are particularly preferred in view of safety.

The resin composition of the invention can be suitably used for injection molding, extrusion molding, calendering, blow molding, balloon molding and other processing methods.

The resin composition of the invention does not require specific procedures such as annealing treatment (heat treatment) in the mold, and can provide molded article with ease by using a common molding machine with an equivalent molding cycle for a general purpose resin such as polypropylene.

The preparation process of thermal resistant molded articles of the invention will hereinafter be illustrated.

1) Injection molding

In injection molding, pellets of the resin composition in the invention are melted in the cylinder of the molding machine, injection into the mold which is maintained at room temperature (0–40° C.) and solidified in the mold. Molded articles can be obtained at a molding cycle of 20–35 seconds, have a Vicat softening point of 100–130° C. and are excellent in thermal resistance.

2) Extrusion molding

In extrusion molding, pellets of the resin composition are melt-kneaded in the cylinder barrel of the extruder and molten resin composition is delivered in the form of a film or sheet through a T-die which is mounted on the head of the cylinder, and successively cooled to obtain thermal resistant articles.

3) Blow-molding (injection blow, stretch blow, direct blow)

In the injection-blow molding, for example, pellets of the resin composition in the invention all melted in a common injection-blow molding machine and charged into a mold to shape a parison. The parison thus obtained is re-heated in an heating oven, and inserted into a mold which is maintained at room temperature (0–40° C.). Successively, pressurized air is fed to blow the parison. Thus, a blown bottle having thermal resistance can be obtained.

4) Vacuum forming, vacuum-pressure forming

A rigid sheet obtained by the above process 2) is clamped on a frame suspended above the mold of a common vacuum-forming machine. The sheet is heat-softened and successively adhered to the mold which is maintained at 0–40° C. by evacuating the space between the sheet and the mold.

Thermal resistant, formed articles which are the object of the invention can be thus obtained.

The resin composition of the invention can be suitably used as a substitute of for resins used for general purposes such as food packaging containers, daily necessaries, leisure goods, medical supplies, agricultural and fishery goods, and industrial goods, which were known in public prior to the application of the invention. Further, the molded articles composed of the resin composition in the invention have a thermal resistance of 100–130° C., and thus can also be used suitably for heat resistant containers, sterilization containers, hot-water-pouring containers, and retort containers.

Specific uses of the molded articles include, for example, dinner set, chopsticks, half-split chopsticks, fork, spoon, skewer, toothpick, lunch box, cold reserving box; disposable containers of lunch and daily dishes which are marketed in convenience stores; cups used for a vending machine of cupped Chinese noodles and drinks; containers and tray of foodstuffs such as fresh fish, fresh meat, vegetables and fruits, and soybean curd; boxes used in a fresh fish market place; bottles and cans of dairy products such as milk, yogurt and lactic beverage; bottles and cans of carbonated drink, mineral water and other soft drinks; bottles and cans of beer, whisky and other liquors; packaging containers of bottles and cans for foodstuffs; parts of writing utensils such as ball point pen, mechanical pencil and pencil; bottles with or without a pumping system for shampoo and liquid soap; tooth paste tube, toiletry container, detergent bottle, cartridge casing of water purifier and other daily necessaries; golf tees, parts of smoking golf ball used for opening ceremony, hunting decoy, hunting shot capsule, camping goods, pile, tying material and other leisure goods; parts of injection syringe, oral medicine capsule, suppository carrier for the anus and the vagina, sticking medicine for skin and mucous membrane, casing for artificial kidney and artificial liver, and other medical goods; agricultural medicine capsule, fertilizer capsule, seedling capsule, flower pot, fishing line reel, fishing buoy, fishing lure and other agricultural and fishing goods; cushioning materials used for transporting ceramic products such as glass pottery, household electric appliances such as television and stereophone, precision machines such as watch, computer and printer, and optical instruments such as camera, glasses, microscope and telescope; and nonskid material and blocks for muddy places and snowy roads, and other industrial goods.

EXAMPLE

The present invention will hereinafter to illustrated in detail by way of examples.

In these examples, the weight average molecular weight (Mw), vicat softening point, fungus resistance and degradability of lactic acid based polymer were measured by the following methods.

1) Weight average molecular weight (Mw)

Measured by gel permeation chromatography (GPC) at column temperature of 40° C. in a chloroform solvent by using polystyrene as a reference.

2) Vicat softening point

Measured in accordance with ASTM D 1525 under 1 kg load by using a molded specimen.

3) Fungus resistance

A medium was previously sterilized and solidified. A test specimen having dimensions of 5 cm×5 cm was placed on the medium thus obtained. A spore suspension of the text fungus shown below was spray-inoculated and cultured in a container at 30° C. for 6 months. Thereafter, growth and development of the fungus was observed and evaluated.

Test fungus

Aspergillus niger

Rhizopus oryzae

Penicillium citrinium

Cladosporium cladosporioides

Chaetomium globosum

Medium

Inorganic salt-agar medium prepared in accordance with JIS Z-2911

Composition

Ammonium nitrate 3.0 g

Potassium phosphate 1.0 g

Magnesium sulfate 0.5 g

Potassium chloride 0.25 g

Ferrous sulfate 0.002 g

Agar 25 g

Purified water 1000 ml

Evaluation method

O: Growth of the fungus was not found.

Δ: Fungus growth area was ⅓ or less.

X: Fungus growth area was more than ⅓.

4) Degradability

A pressed film having dimensions of 10 cm×30 cm×100 μm (thickness) was prepared. The film was buried in a compost having a moisture content of 60% at 58° C., and time-dependent change was observed.

Evaluation method

⊚: Degraded and disappeared within 7 days

O: Degraded and disappeared at 7–14 days

Δ: Degraded and disappeared at 15–25 days

X: Degraded and disappeared at 26–40 days

Preparation Example 1

To a thick-walled, cylindrical, stainless steel polymerization vessel equipped with a stirrer, 400 g of L-lactide, 0.04 g of stannous octoate and 0.12 g of lauryl alcohol were charged, deaerated under vacuum for 2 hours, successively substituted with nitrogen gas, and heated with stirring at 200° C./10 mmHg for 2 hours.

After finishing the reaction, molten polylactic acid was discharged from the bottom of the polymerization vessel, cooled in the air and cut into pellets with a pelletizer. Polylactic acid thus obtained was 340 g. The yield was 85%. The weight average molecular weight (MW) was 138,000.

Preparation Example 2

To a reaction vessel equipped with a Dean-Stark trap, 10 kg of 90% L-lactic acid and 45 g of tin powder were charged, stirred at 150° C./50 mmHg for 3 hours while distilling out water, and successively stirred at 150° C./30 mmHg for further 2 hours to obtain an oligomer. To the oligomer, 21.1 kg of diphenyl ether was added and an azeotropic dehydration reaction was carried out at 150° C./35 mmHg while separating distilled water from the solvent in the water separator and returning the solvent alone to the reaction vessel. After 2 hours, a column packed with 4.6 kg of molecular sieve 3A was mounted on the reaction vessel so as to return the solvent to the reaction vessel after passing through the molecular sieve layer. The reaction was further continued at 150° C./35 mmHg for 40 hours. A solution of polylactic acid having a weight average molecular weight (MW) of 145,000 was obtained. The solution was diluted with 44 kg of anhydrous diphenyl ether and cooled to 40° C. The precipitated crystals were filtered, washed three times with 10 kg of n-hexane and dried at 60° C./50 mmHg. To the powder thus obtained, 12 kg of a 0.5N aqueous HCl solution and 12 kg of ethanol were added, stirred at 35° C. for an hour, filtered, and dried at 60° C./50 mmHg to obtain 6.1 kg of polylactic acid powder. The yield was 85%. The powder was pelletized by melting with an extruder to obtain polylactic acid. The polymer had a weight average molecular weight (MW) of 143,000.

Preparation Example 3

To a reaction vessel equipped with a Dean-Stark trap, 50.5 kg of 1,4-butanediol, 66.5 kg of succinic acid and 45 g of tin powder were charged. The mixture was stirred at 100° C. for 3 hours while distilling water out of the reaction vessel and successively stirred at 150° C./50 mmHg further for 2 hours to obtain an oligomer. To the oligomer, 38.5 kg of diphenyl ether was added and an azeotropic dehydration reaction was carried out at 150° C./35 mmHg while separating distilled water from the solvent in the water separator and returning the solvent alone to the reaction vessel. After 2 hours, a column packed with 50 kg of molecular sieve 3A was mounted on the reaction vessel so as to return the solvent to the reaction vessel after passing through the molecular sieve layer. The reaction was further continued at 130° C./17 mmHg for 15 hours. A solution of polybutylene succinate (hereinafter referred to simply as PSB) having a weight average molecular weight (MW) of 140,000 was obtained. The solution was diluted with 160 kg of anhydrous diphenyl ether and cooled to 40° C. The precipitated crystals were filtered. To the crystals obtained, 200 kg of a 0.5N aqueous HCl solution and 200 kg of ethanol were added, stirred at 25° C. for an hour, filtered, and dried at 60° C./50 mmHg to obtain 91.5 g of PSB having a average molecular weight (MW) of 138,000. The yield was 94.8%.

In the next step, polylactic acid having a weight average molecular weight (MW) of 21,000 was obtained after an hour from initiation of passing the solvent through the molecular sieve 3A by the similar procedure as Preparation Example 2. To the resulting reaction mass composed of 750 g of polylactic acid and 2250 g of diphenyl ether, 187.5 g of the above obtained polybutylene succinate having a weight average molecular weight of 138,000 was added and further reaction at 130° C./17 mmHg for 20 hours. The resulting reaction solution was diluted with 3,000 g of diphenyl ether and cooled to 40° C. The precipitated crystals were filtered. To the crystals, 2,000 g of a 0.5N aqueous HCl solution and 2,000 g of ethanol were added and stirred at 25° C. for an hour. The crystals were successively filtered and dried at 60° C./5 mmHg to obtain 890 g of a block copolymer of polylactic acid with PSB. The yield was 94.9%. The copolymer had a lactic acid component of 80% by weight and a weight average molecular weight of 146,000.

Preparation Example 4

To a reaction vessel equipped with a Dean-Stark trap, 111 kg of 6-hydroxycaproic acid and 45 g of tin powder were charged. The mixture was stirred at 100° C. for 3 hours while distilling water out of the reaction vessel and successively stirred at 150° C./50 mmHg for 2 hours to obtain an oligomer. To the oligomer, 38.5 kg of diphenyl ether was added and an azeotropic dehydration reaction was carried out at 150° C./35 mmHg while separating distilled water from the solvent in the water separator and returning the solvent alone to the reaction vessel. After 2 hours, a column packed with 50 kg of molecular sieve 3A was mounted on the reaction vessel so as to return the solvent to the reaction vessel after passing through the molecular sieve layer. The reaction was further continued at 130° C./17 mmHg for 15 hours. A solution of polycaproic acid (hereinafter referred to simply as PCL) having a weight average molecular weight (MW) of 110,000 was obtained. The solution was diluted with 160 kg of anhydrous diphenyl ether and cooled to 40° C. The precipitated crystals were filtered. To the crystals obtained, 200 kg of a 0.5N aqueous HCl solution and 200 kg of ethanol were added, stirred at 25° C. for an hour, filtered, and dried at 60° C./50 mmHg to obtain 92.4 kg of PCL having a average molecular weight (MW) of 104,000. The yield was 96.0%.

In the next step, polylactic acid having a weight average molecular weight (MW) of 21,000 was obtained after an hour from initiation of passing the solvent through the molecular sieve 3A by the similar procedure as Preparation Example 2. To the resulting reaction mass composed of 750 g of polylactic acid and 2250 g of diphenyl ether, 187.5 g of the above obtained PCL having a weight average molecular weight of 104,000 was added and further reacted at 130° C./17 mmHg for 20 hours. The resulting reaction solution was diluted with 3,000 g of diphenyl ether and cooled to 40° C. The precipitated crystals were filtered. To the crystals, 2,000 g of a 0.5N aqueous HCl solution and 2,000 g of ethanol were added and stirred at 25° C. for an hour. The crystal was successively filtered and dried at 60° C./50 mmHg to obtain 879.4 g of a block copolymer of polylactic acid with PCL. The yield was 93.8%. The copolymer had a lactic acid component of 80% by weight and a weight average molecular weight of 132,000.

Preparation process of the thermal resistant resin composition in the invention from the lactic acid-based polymer obtained in Preparation Examples 1–4 will be shown by way of examples hereinafter.

Examples 1–11

To polylactic acid, a block copolymer of polylactic acid with polybutylene succinate, or block copolymer of polylactic acid with polycaproic acid which is obtained in Preparati on Examples 1–4, polybutylene succinate having a melting point of 110° C. and an inorganic filler were mixed with a Henschel mixer in an amount shown in Table 1 and pelletized by setting the cylinder temperature of an extruder at 170–210° C. The pellets thus obtained were injection molded with an injection molding machine, model JSW-75 manufactured by Japan Steel Works Co., at a cylinder temperature of 180–200° C. and at a mold temperature and molding cycle shown in Table 1. ASTM test specimens thus prepared were used for testing physical properties. Results are shown in Table 1.

Comparative Examples 1–12

To polylactic acid, a block copolymer of polylactic acid with polybutylene succinate, or block copolymer of polylactic acid with polycaproic acid which is obtained in Preparation Examples 1–4, polybutylene succinate having a melting point of 110° C. and an inorganic filler were mixed with a Henschel mixer in an amount shown in Table 2 and pelletized by the same procedures as shown in Example 1. The pellets thus obtained were injection molded by the same procedures as shown in Example 1. ASTM test specimens thus prepared were used for testing physical properties. Results are shown in Table 2.

Crystalline inorganic fillers which were used in the examples and comparative examples are as follows:

Kaolin JP 100: manufactured by Tsuchiya Kaolin Ind. Ltd.

NN Kaolin Clay: manufactured by Tsuchiya Kaolin Ind. Ltd.

Kaolinite ASP-170: manufactured by Fuji Talc Ind. Co. Ltd.

Kaolin UW: manufactured by Engelhard Co.

Talc TM-30: manufactured by Fuji Talc Ind. Co. Ltd.

Talc RF: manufactured by Fuji Talc Ind. Co. Ltd.

Cyloid 244: manufactured by Fuji Silycia Chemical Ltd.

Aerosil 200: manufactured by Nippon Aerosil Co. Ltd.

TABLE 1

|  | Example 1 | Example 2 | Example 3 | Example 4 | Example 5 | Example 6 |
|---|---|---|---|---|---|---|
| Lactic acid based polymer (wt %) | Preparation Example 1 75 | Preparation Example 2 55 | Preparation Example 2 70 | Preparation Example 3 75 | Preparation Example 4 75 | Preparation Example 2 70 |
| Aliphatic polyester (PSB) (wt %) | 25 | 45 | 30 | 25 | 25 | 30 |
| Inorganic filler |  |  |  |  |  |  |
| Kinds of filler | Talc TM-30 | Talc TM-30 | Talc TM-30 | Talc TM-30 | Talc TM-30 | Kaolin JP100 |
| Property | crystalline | crystalline | crystalline | crystalline | crystalline | crystalline |
| Contents of $SiO_2$ (wt %) | 60 | 60 | 60 | 60 | 60 | 80 |
| Parts by weight | 25 | 5 | 10 | 15 | 20 | 10 |
| Molding conditions |  |  |  |  |  |  |
| temperature of mold (° C.) | 25 | 25 | 25 | 25 | 25 | 25 |
| Molding cycle (sec) | 25 | 25 | 25 | 25 | 25 | 25 |
| Vicat softening point (° C.) | 125 | 113 | 115 | 118 | 110 | 115 |
| Fungus resistance | ◯ | ◯ | ◯ | ◯ | ◯ | ◯ |
| Degradability | ⊙ | ◯ | ⊙ | ◯ | ◯ | ⊙ |

|  | Example 7 | Example 8 | Example 9 | Example 10 | Example 11 |
|---|---|---|---|---|---|
| Lactic acid based polymer (wt %) | Preparation Example 2 70 | Preparation Example 2 70 | Preparation Example 2 70 | Preparation Example 2 70 | Preparation Example 2 30 |
| Aliphatic polyester (PSB) (wt %) | 30 | 30 | 30 | 30 | 70 |
| Inorganic filler |  |  |  |  |  |
| Kinds of filler | NN Kaolin Clay | Talc RF | Kaolin UW | Kaolinite ASP-170 | Talc TM-30 |
| Property | crystalline | crystalline | crystalline | crystalline | crystalline |
| Contents of $SiO_2$ (wt %) | 78 | 40 | 45 | 40 | 60 |
| Parts by weight | 10 | 10 | 10 | 10 | 50 |
| Molding conditions |  |  |  |  |  |
| temperature of mold (° C.) | 25 | 25 | 25 | 25 | 25 |
| Molding cycle (sec) | 25 | 35 | 35 | 35 | 20 |
| Vicat softening point (° C.) | 115 | 115 | 115 | 115 | 110 |
| Fungus resistance | ◯ | ◯ | ◯ | ◯ | ◯ |
| Degradability | ⊙ | ⊙ | ⊙ | ⊙ | ◯ |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Lactic acid based polymer (wt %) | Preparation Example 2 100 | Preparation Example 2 85 | Preparation Example 1 70 | Preparation Example 2 85 | Preparation Example 2 70 | Preparation Example 2 70 |
| Aliphatic polyester (PSB) (wt %) | 0 | 15 | 30 | 15 | 30 | 30 |
| Inorganic filler |  |  |  |  |  |  |
| Kinds of filler | Talc TM-30 | Talc TM-30 | — | Cyloid 244 | Aerosil 200 | zinc oxide |
| Property | crystalline | crystalline | — | amorphous | amorphous | crystalline |
| Contents of $SiO_2$ (wt %) | 60 | 60 | — | 99 | 99 | 0 |
| Parts by weight | 10 | 10 | none | 10 | 10 | 10 |

TABLE 2-continued

| Molding conditions | | | | | | |
|---|---|---|---|---|---|---|
| temperature of mold (° C.) | 25 | 25 | 25 | 25 | 25 | 25 |
| Molding cycle (sec) | 60 | 60 | 55 | 70 | 60 | 65 |
| Vicat softening point (° C.) | 60 | 60 | 115 | 60 | 115 | 60 |
| Fungus resistance | ○ | ○ | ○ | ○ | ○ | ○ |
| Degradability | ◎ | ◎ | ◎ | ◎ | ◎ | ◎ |

| | Comparative Example 7 | Comparative Example 8 | Comparative Example 9 | Comparative Example 10 | Comparative Example 11 | Comparative Example 12 |
|---|---|---|---|---|---|---|
| Lactic acid based polymer (wt %) | Preparation Example 2 70 | Preparation Example 2 70 | Preparation Example 2 70 | Preparation Example 2 20 | — | — |
| Aliphatic polyester (PSB) (wt %) | 30 | 30 | 30 | 80 | 100 | 100 |
| Inorganic filler | | | | | | |
| Kinds of filler | barium sulfate | titanium oxide | calcium carbonate | Talc TM-30 | Talc TM-30 | — |
| Property | crystalline | crystalline | crystalline | crystalline | crystalline | — |
| Contents of SiO$_2$ (wt %) | 0 | 0 | 0 | 60 | 60 | — |
| Parts by weight | 10 | 10 | 10 | 15 | 30 | — |
| Molding conditions | | | | | | |
| temperature of mold (° C.) | 25 | 25 | 25 | 25 | 25 | |
| Molding cycle (sec) | 65 | 65 | 65 | 30 | 25 | 50 |
| Vicat softening point (° C.) | 60 | 60 | 60 | 110 | 110 | 110 |
| Fungus resistance | ○ | ○ | ○ | Δ | X | X |
| Degradability | ◎ | ◎ | ◎ | Δ | X | X |

What is claimed is:

1. A heat resistant resin composition comprising 100 parts by weight of polyester (A) having 25–75% by weight of lactic acid units and 0.1–70 parts of a crystalline inorganic filler (B) containing 10% by weight or more of SiO$_2$, wherein the polyester (A) consists of a mixture of 25–75% by weight of a lactic acid-based polymer (a1) and 25–75% by weight of other aliphatic polyester (a2) having a melting point of 100–250° C.

2. The thermal resistant resin composition according to claim 1 wherein the crystalline inorganic filler (B) is one or more fillers selected from the group consisting of talc, kaolin, clay and kaolinite.

3. The thermal resistant resin composition according to claim 1 wherein the aliphatic polyester (a2) is one or more polyester selected from the group consisting of polyethylene oxalate, polybutylene oxalate, polyneopentyl glycol oxalate, polyethylene succinate, polybutylene succinate, polyglycolic acid, polyhydroxybutyric acid, and a copolymer of β-hydroxybutyric acid with β-hydroxyvaleric acid.

4. The thermal resistant resin composition according to claim 2 wherein the aliphatic polyester (a2) is one or more polyester selected from the group consisting of polyethylene oxalate, polybutylene oxalate, polyethylene succinate, polybutylene succinate, polyglycolic acid, polyhydroxybutyric acid, and a copolymer of β-hydroxybutyric acid with β-hydroxyvaleric acid.

5. The thermal resistant resin composition according to claim 4 wherein the aliphatic polyester (a2) is polybutylene succinate.

6. The thermal resistant resin composition according to claim 3 wherein the lactic acid-based polymer (a1) is one or more polymer selected from the group consisting of polylactic acid, a copolymer consisting of lactic acid and other hydroxycarboxylic acid and containing 50% by weight or more of lactic acid units, and a copolymer consisting of lactic acid, aliphatic diyhydric alcohol and aliphatic dicarboxylic acid and containing 50% by weight or more of lactic acid units.

7. The thermal resistant resin composition according to claim 4 wherein the lactic acid-based polymer (a1) is one or more polymer selected from the group consisting of polylactic acid, a copolymer consisting of lactic acid and other hydroxycarboxylic acid and containing 50% by weight or more of lactic acid units, and a copolymer consisting of lactic acid, aliphatic diyhydric alcohol and aliphatic dicarboxylic acid and containing 50% by weight or more of lactic acid units.

8. The thermal resistant resin composition according to claim 6 wherein the lactic acid-based polymer (a1) is polylactic acid.

9. The thermal resistant resin composition according to claim 7 wherein the lactic acid-based polymer (a1) is polylactic acid.

10. The thermal resistant resin composition according to claim 6 wherein the lactic acid-based polymer (a1) is a copolymer of lactic acid with 6-hydroxycaproic acid or copolymer of lactic acid, 1,4-butanediol and succinic acid.

11. The thermal resistant resin composition according to claim 7 wherein the lactic acid-based polymer (a1) is a copolymer of lactic acid with 6-hydroxycaproic acid or a copolymer of lactic acid, 1,4-butanediol and succinic acid.

12. The thermal resistant resin composition according to claim 10 wherein the lactic acid-based polymer (a1) is a block copolymer.

13. The thermal resistant resin composition according to claim 11 wherein the lactic acid-based polymer (a1) is a block copolymer.

14. A molded article being obtained from the thermal resistant resin composition according to claim 1 and having heat-resistant temperature of 100–130° C.

15. A molded article being obtained from the thermal resistant resin composition according to claim 9 and having heat-resistant temperature of 100–130° C.

16. A molded article being obtained from the thermal resistant resin composition according to claim 11 and having heat-resistant temperature of 100–130° C.

17. A molded article having obtained from the thermal resistant resin composition according to claim 13 and having heat-resistant temperature of 100–130° C.

* * * * *